(12) United States Patent
Panetta

(10) Patent No.: US 8,503,137 B2
(45) Date of Patent: Aug. 6, 2013

(54) ARC FAULT PROTECTION CIRCUIT AND METHOD

(75) Inventor: Sergio Panetta, Brampton (CA)

(73) Assignee: I-Gard Corporation, Mississauga (CA)

( * ) Notice: Subject to any disclaimer, the term of this patent is extended or adjusted under 35 U.S.C. 154(b) by 105 days.

(21) Appl. No.: 13/172,021

(22) Filed: Jun. 29, 2011

(65) Prior Publication Data
US 2013/0003233 A1  Jan. 3, 2013

(51) Int. Cl.
*H02H 3/00* (2006.01)
*H02H 7/00* (2006.01)
(52) U.S. Cl.
USPC .......................... 361/10; 361/2; 361/3; 361/9
(58) Field of Classification Search
USPC ......................................................... 361/2, 9
See application file for complete search history.

(56) References Cited

U.S. PATENT DOCUMENTS

| | | | |
|---|---|---|---|
| 3,957,329 A | | 5/1976 | McConnell |
| 5,737,160 A | * | 4/1998 | Duffy ................................ 361/3 |
| 6,104,583 A | * | 8/2000 | Wynn et al. ....................... 361/7 |
| 7,821,756 B2 | * | 10/2010 | Chishima ..................... 361/93.7 |
| 2008/0310058 A1 | | 12/2008 | Premerlani et al. |

OTHER PUBLICATIONS

Schneider Electric, "Masterpact NW 800-6300 A," Fiche technique/ Technical Data Sheet, 2009, (9 pages).

* cited by examiner

*Primary Examiner* — Dharti Patel

(57) ABSTRACT

An arc fault protection circuit and method, provides arc fault protection in a multiphase power system by actuating a plurality of disconnect switches to disconnect the source from the load in response to detecting arcing proximate the load. As well, in response to detecting the arc, a plurality of impedances are introduced into the current path between said source and said load, with each of the impedances increasing the impedance between the source and the load along one phase, prior to the plurality of disconnect switches disconnecting the source from the load.

20 Claims, 1 Drawing Sheet

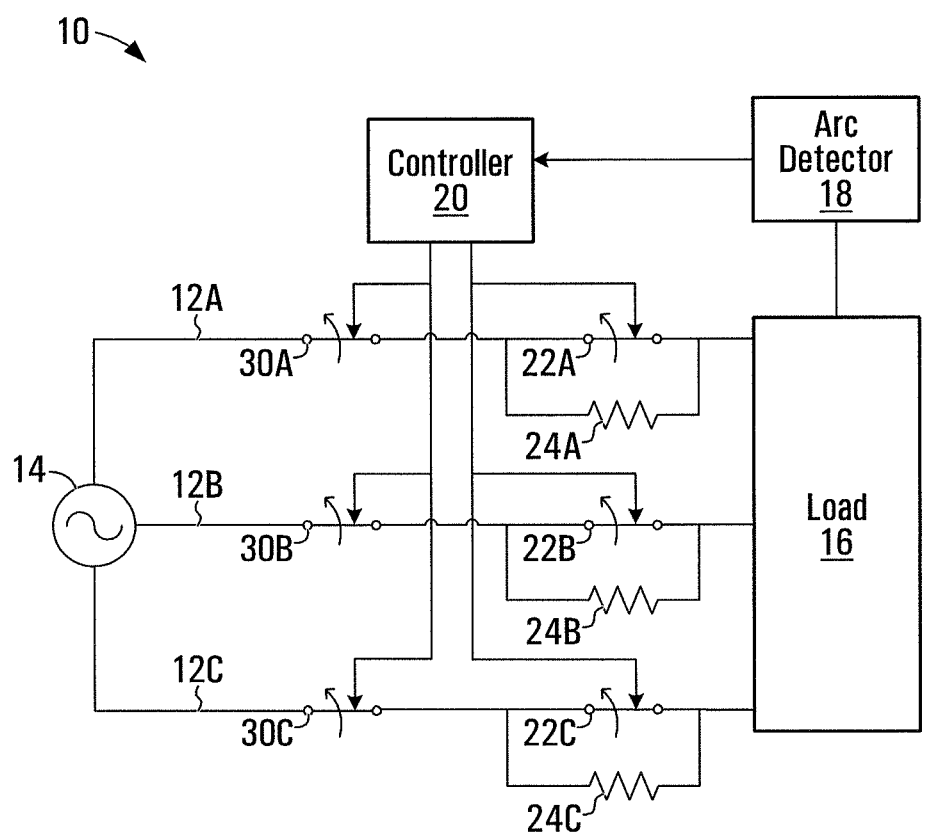

ARC FAULT PROTECTION CIRCUIT AND METHOD

FIELD OF THE INVENTION

The present invention relates generally to arc faults in multiphase electrical systems, and more particularly to an arc fault protection circuit.

BACKGROUND OF THE INVENTION

Electrical faults remain the source of injury and destruction. Typical electrical faults include ground faults and arc faults.

Ground faults usually result from a low (or lower) current path between the electrical source and ground. Arc faults, on the other hand, result from parallel arcing (line to neutral); series arcing, caused by a loose, broken or otherwise high resistant segment in a single line; or ground arcing from a line or neutral to ground. Arc faults are typically characterized by the presence of ionization of air and other gases, and may result in considerable currents, and release of energy.

As such, arc faults can easily result in property and personnel damage, resulting from heat, and such faults need to be contained quickly. To this end, residential arc fault circuit interrupters (AFCIs) are often used in homes. In industrial multi-phase settings, arc fault protectors often create a low impedance path upstream of the load to decrease the energy incident on the load. Creating such a low impedance path, however, often results in damage to the source and to the transmission lines, and may also place electrical and mechanical stress on the remainder of the multi-phase system.

Accordingly, there remains a need for an improved arc fault protection system or circuit.

SUMMARY OF THE INVENTION

Exemplary of embodiments of the present invention, an arc fault protection circuit and method provides arc fault protection in a multiphase power system, by actuating a plurality of disconnect switches to disconnect the source from the load in response to detecting arcing proximate said load. Additionally, in response detecting the arc, a plurality of impedances introduced into the current paths between the source and said load, with each one of said plurality of impedances increasing the impedance between the source and the load along one phase prior to the plurality of disconnect switches disconnecting said source from said load. The introduction of impedances limits current flow and energy transferred to the load while the disconnect switches are transitioning to their open state.

In accordance with an aspect of the present invention, there is provided a multiphase power distribution system. The system comprises: a source, and load, interconnected by a multiphase line; an arc detector for detecting arcing proximate the load; a first plurality of switches, each having a pair of contacts in series with one phase of the multiphase line between the source and the load; a plurality of impedances, one of the plurality of impedances in parallel with each of the first plurality of switches interconnecting its pair of contacts, to provide a high impedance path between its pair of contacts when opened; a second plurality of switches, one in series with each of the phases of the multiphase line between the source and the load, the arc detector in communication with and the first plurality of switches to open the first plurality of switches in response to the arc detector detecting arcing proximate the load, thereby inserting a high impedance path between the source and the load, and the second plurality of switches to disconnect the source from the load in response to the arc detector detecting arcing proximate the load.

In accordance with another aspect of the present invention, there is provided a method of providing arc fault protection in a multiphase power system. The method comprises: providing a plurality of disconnect switches, one in series with each phase of the multiphase line between the source and the load, in response to detecting arcing proximate the load, actuating the plurality of disconnect switches to disconnect the source from the load; in response to the detecting, introducing a plurality of impedances in the current path between the source and the load, with each one of the plurality of impedances increasing the impedance between the source and the load along one phase prior to the plurality of disconnect switches disconnecting the source from the load.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention, FIG. 1 is a schematic diagram of a multiphase system including an arc fault protection circuit exemplary of an embodiment of the present invention.

DETAILED DESCRIPTION

FIG. 1 illustrates an arc fault protection circuit 10 for use in a multiphase electrical system, exemplary of embodiments of the present invention. As illustrated, a multiphase line in the form of cabling 12, that may be a multiphase transmission line, multiphase cables or the like, interconnects a multiphase source 14 of electrical power to a load 16.

Load 16 is typically an industrial load, and may be motor, a power distribution station, an industrial plant, or the like. Source 14 may be a multiphase generator, distribution hub, uninterrupted power supply (UPS), or the like, and may, for example, provide 600V, 2400V, or 4160 V three phase power, at 1200 or higher amperes, at 50 or 60 Hz. Of course source 14 may provide electrical power at other frequencies, voltages, and number of phases.

In the depicted embodiment, the multiphase system is three phase. As such, cabling 12 includes three conductors 12a, 12b and 12c for the delivery of three phase electrical energy/power to load 16. Cabling 12 could further include a neutral conductor (not shown).

Located at or proximate load 16, for example within the switchgear proximate load 16, is an arc fault detector 18. Arc fault detector 18 may be any conventional detection device capable of detecting the presence of arcing. Arc fault detector 18 may be an optical or chemical sensor, a pressure transducer, a current sensor, a temperature sensor or the like. Arc fault detector 18 thus typically detects some artefact of electrical arcing (e.g. flash, ionized air, sound, etc.). Arc fault detector 18 is in communication with controllable switches 22a, 22b and 22c (individually and collectively switches 22), through a controller 20.

Switches 22 are normally closed. Impedances 24a, 24b and 24c are respectively connected in parallel with switches 22a, 22b and 22c with one impedance connected in parallel with each switch 22 (i.e. across the switch contacts of each switch 22). Each switch 22, when closed, thus provides a low impedance path through switch 22 along each phase of transmission line 12.

By contrast, when switches 22 are open, impedances 24 provide a high (or higher) impedance path along conductors 12. Impedances 24 may each provide in the order of 0.1 to 100 ohms of resistance, and in a typical embodiment 1 ohm of resistance for a 600V system. For higher voltages, higher impedances may be appropriate.

Switches 22 may be formed as high speed solid state switches formed, for example, as semiconductor discharge switches, that may transition between closed and open states in a fraction of the cycle of the AC power that is provided by source 14. For example, switches 22 may be capable of changing state in one-half cycle or less of source 14. So, for 60 Hz current, switches 22 may be capable of switching state in 8 ms or less; for 50 HZ current in 10 ms or less. Switches 22 may for example be implemented as N-Type Semiconductor Discharge switches provided by Silicon Power, of Malvern PA, under the trademark Solidtron (e.g. model CCSSC14N40A10).

Controller 20 may a programmable logic controller (PLC) or other controller suitable for actuating the opening switches 22, and, may form part of the arc fault detector 18. Controller 20 may provide a control/actuation signal upon detection of an arc, used to actuate switches 22 and 30.

Arc fault limiting circuit 10 may include further circuit break or disconnect switches 30a, 30b, 30c (individually and collectively switches 30) in series with transmission line phases 12a, 12b and 12c, upstream of switch 22, proximate source 14. Circuit break switches 30 act as circuit breakers to disconnect source 14 from downstream components and conductors 12. Switches 30 may, for example, be electromechanical, and may thus physically disconnect source 14 from load 16, and provide desired safety to personnel proximate load 16.

In operation, source 14 provides electrical power to load 16 by way of cabling 12. Arc fault detector 18 monitors load 16 for the occurrence of arcing at or proximate load 16. As noted, arc fault detector may monitor for the presence of an indicator of an arc—by for example sensing light, ionized air, a change in pressure, sound, or the like. Upon detection of an arc, arc detector 18 provides a control signal to controller 20.

Controller 20, in turn actuates the opening switches 22a, 22b and 22c, concurrently thereby introducing impedances 24 into the electrical path between source 14 and load 16. Opening of switches 22 may for example be actuated by a control signal from controller 20.

The introduction and presence of impedances 24 in the current path limits the amount of current provided by source 14 to load 16, thereby limiting damage to load 16 and personnel in the vicinity of load 16, and more generally system 10.

Concurrently with the opening of switches 22, controller 20 may further actuate the opening of switches 30a, 30b, 30c, thereby physically disconnecting source 14 from downstream components of the multiphase system, including transmission lines 12 and load 16. This further protects source 16, and limits damage to the multiphase system.

Conveniently, although opening of switches 30 and solid state switches 22 may be initiated concurrently, solid state switches 22 may be opened more quickly than switches 30, which are typically electromechanical thereby quickly limiting current to load 16 before damage may be done. As a result, impedances 24 are introduced into the current path between source 14 and load 16, before disconnect switches 30 disconnect source 14 from load 16.

Typically, switches 30 open in three to five cycles of the current of source 14 (e.g. 43-83 ms, for a 50 to 60 Hz source). In the presence of a fault, 50-200 kA of fault current may be drawn. As will be appreciated, 50 kA through the protected system for 83 ms can cause significant damage of equipment, and harm to personnel. Conveniently, opening switches 22 and introducing impedances 24 may limit the fault current to 50 kA for 8 ms or less, and thus 400 A until switches 30 are open (e.g. 75 ms). This may reduce incident energy on load and may provide a safer work environment as recommended by CSA Z462 and NFPS 70E (see for example IEEE 1584 for calculation details).

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A multiphase power distribution system comprising:
   a source, and load, interconnected by a multiphase line;
   an arc detector for detecting arcing proximate a load;
   a first plurality of switches, each having a pair of contacts in series with one phase of a multiphase line between said source and said load;
   a plurality of impedances, one of a plurality of impedances in parallel with each of a first plurality of switches interconnecting its pair of contacts, to provide a high impedance path between its pair of contacts when opened;
   a second plurality of switches, one of said second plurality of switches in series with each of said phases of said multiphase line between said source and said load,
   said arc detector in communication with and said first plurality of switches to open said first plurality of switches in response to said arc detector detecting arcing proximate said load, thereby inserting a high impedance path between said source and said load, and said second plurality of switches to disconnect said source from said load in response to said arc detector detecting arcing proximate said load.

2. The multiphase power distribution system of claim 1, wherein said arc fault detector optically detects arcing.

3. The multiphase power distribution system of claim 1, wherein said arc fault detector chemically detects arcing.

4. The multiphase power distribution system of claim 1, wherein said first plurality of switches opens more quickly than said second plurality of switches.

5. The multiphase power distribution system of claim 4, wherein said first plurality of switches and said second plurality of switches are actuated to open concurrently.

6. The multiphase power distribution system of claim 5, further comprising a controller in communication with said arc fault detector and said first and second plurality of switches to control said first and second plurality of switches.

7. The multiphase power distribution system of claim 6, wherein said controller is integrated with said arc detector.

8. The multiphase power distribution system of claim 5, wherein each of said second plurality of switches is electromechanical.

9. The multiphase power distribution system of claim 8 wherein each of said first plurality of switches is a solid state switch.

10. The multiphase power distribution system of claim 9, wherein said first switches open in a fraction of a period of said source, and said second switches open in an interval exceed a period of said source.

11. The multiphase power distribution system of claim 10, wherein said source provides at least one of 600V, 2400V, or 4160 V three phase AC power.

12. The multiphase power distribution system of claim 1, wherein said arc fault detector detects at least one of pressure and temperature.

13. The method of claim 1, wherein said detecting comprises detecting at least one of pressure and temperature.

14. A method of providing arc fault protection in a multiphase power system, said method comprising:
 providing a plurality of disconnect switches, one in series with each phase of a multiphase line between a source and a load,
 in response to detecting arcing proximate said load, actuating said plurality of disconnect switches to disconnect said source from said load;
 in response to said detecting, introducing a plurality of impedances in the current path between said source and said load, with each one of said plurality of impedances increasing the impedance between said source and said load along one phase, prior to said plurality of disconnect switches disconnecting said source from said load.

15. The method of claim 14, wherein each of said plurality of impedances, is in parallel with a switch interconnecting its pair of contacts, and wherein each impedance is introduced into the current path by opening a respective switch.

16. The method of claim 15, wherein said disconnect switches and each switch used to introduce each impedance are actuated to open concurrently.

17. The method of claim 16, wherein each said switch used to introduce each of said impedances opens more quickly than said disconnect switches.

18. The method of claim 17, wherein each said switch used to introduce each of said impedances is a solid state switch.

19. The method of claim 18, wherein each of said disconnect switches is an electromechanical switch.

20. A multiphase power system comprising:
 a plurality of disconnect switches, each one for connection in series with each phase of a multiphase line between a source and a load,
 means for detecting arcing proximate said load,
 means for actuating said plurality of disconnect switches to disconnect said source from said load;
 means for introducing a plurality of impedances in the current path between said source and said load, with each one of said plurality of impedances increasing the impedance between said source and said load along one phase, prior to said plurality of disconnect switches disconnecting said source from said load.

* * * * *